United States Patent
Hall et al.

(10) Patent No.: US 6,814,503 B2
(45) Date of Patent: Nov. 9, 2004

(54) FIBER OPTIC ASSEMBLY

(75) Inventors: Richard R. Hall, Endwell, NY (US); How Tzu Lin, Vestal, NY (US); Candido C. Tiberia, Endicott, NY (US)

(73) Assignee: International Business Machines Corporation, Armonk, NY (US)

( * ) Notice: Subject to any disclaimer, the term of this patent is extended or adjusted under 35 U.S.C. 154(b) by 71 days.

(21) Appl. No.: 10/215,175

(22) Filed: Aug. 7, 2002

(65) Prior Publication Data

US 2002/0196441 A1 Dec. 26, 2002

Related U.S. Application Data

(62) Division of application No. 09/327,783, filed on Jun. 7, 1999, now Pat. No. 6,471,419.

(51) Int. Cl.[7] .................................................. G02B 6/36
(52) U.S. Cl. .............................. 385/91; 385/49; 385/52; 385/15; 356/400
(58) Field of Search .......................... 385/14–15, 49–50, 385/52, 53–55, 75, 88–90, 91, 136, 147; 356/400

(56) References Cited

U.S. PATENT DOCUMENTS

| | | | |
|---|---|---|---|
| 4,405,201 A | 9/1983 | Cefarelli et al. | |
| 4,441,785 A | 4/1984 | Petrozello | |
| 4,553,813 A | 11/1985 | McNaughton et al. | |
| 4,623,220 A | 11/1986 | Grabbe | |
| 4,650,285 A | 3/1987 | Stevenson | |
| 4,668,044 A | 5/1987 | D'Auria et al. | |
| 4,790,617 A | 12/1988 | Campbell et al. | |
| 4,883,342 A | 11/1989 | Ishil et al. | |
| 5,381,494 A | 1/1995 | O'Donnell et al. | |
| 5,655,041 A | 8/1997 | Forrest et al. | |
| 5,666,450 A | * 9/1997 | Fujimura et al. | 385/93 |
| 5,671,311 A | 9/1997 | Stillie et al. | |
| 5,781,682 A | 7/1998 | Cohen et al. | |
| 5,812,258 A | 9/1998 | Pierson | |

* cited by examiner

Primary Examiner—Richard A. Rosenberger
Assistant Examiner—Michael P. Mooney
(74) Attorney, Agent, or Firm—Mark Levy & Associates; Lawrence R. Fraley

(57) ABSTRACT

A method and apparatus are disclosed for aligning an array of light transmitting elements to an array of photosensitive detectors. The array is adjusted along three axes. Any element (a coupled transmitting and detecting unit of the array) can be selected as the center of rotation. Small angular correction is made about the selected element by differentially moving the array in two axes, using adjustment tools. Alignment is accomplished by performing translational movement in the horizontal X and Y axes until a signal is detected. A rotational correction about the selected element is performed by moving one of a pair of adjustment devices until maximum light intensity is achieved for the end elements. Next, the array is scanned for the weakest performing element in the array. The alignment procedure is repeated until the performance of all of the elements in the array fall within a pre-established specification range.

7 Claims, 5 Drawing Sheets

FIBER OPTIC ASSEMBLY

This is a divisional of application Ser. No. 09/327,783 filed Jun. 7, 1999 now U.S Pat. No. 6,471,419.

FIELD OF THE INVENTION

The present invention relates to fiber optic alignment methods and devices and, more particularly, to a fiber optic alignment apparatus for accurately assembling a fiber optic transmitter/receiver to a coupler.

BACKGROUND OF THE INVENTION

A transmitter/receiver in the form of a gallium arsenide semi-conductor die chip can be mounted to a substrate carrier to provide ease of handling. The semi-conductor chip, however, cannot be mounted to the substrate carrier with sufficient accuracy for aligning the carrier with the optical fibers of a coupler. Commercially available devices are unable to accomplish the task, due to the extremely high tolerances presented by such a small assembly unit. The present invention is for an alignment device and procedure for accomplishing the alignment of the optical fibers of a coupler with the aforementioned die chip and substrate carrier unit.

The alignment device of the current invention aligns and bonds the chip and substrate unit to the coupler. The inventive apparatus has the advantage of allowing the testing of the optical transmission through the fibers during the alignment procedure.

DISCUSSION OF RELATED ART

In U.S. Pat. No. 4,553,813, issued on Nov. 19, 1985 to McNaughton et al, for FIBER OPTIC CONNECTOR SYSTEM FOR INTEGRATED CIRCUIT MODULES, a system having an optically terminated module with built-in retention is illustrated. Fiber optic signal lines are connected directly to light emitting diodes mounted upon an integrated circuit chip.

U.S. Pat. No. 4,668,044, issued on May 26, 1987 to D'Auria et al, for OPTOELECTRONIC COUPLER FOR OPTICAL FIBERS PROVIDING ADJUSTABLE LIGHT-ENERGY EXTRACTION AND A BIDIRECTIONAL DATA TRANSMISSION SYSTEM FOR PRACTICAL APPLICATION OF THE COUPLER, comprises a coupler having a photodiode with a central passage, and an end-face that is adjustably distanced from the photodiode in order to adjust the light energy being extracted therefrom.

U.S. Pat. No. 4,883,342, issued to Ishii et al on Nov. 28, 1989 for METHOD OF ASSEMBLING A LIGHT EMITTING DEVICE WITH AN OPTICAL FIBER, includes a light emergence device, an optic fiber connected thereto, and an optical fiber supporting member. The support member is deformable in order to align the optical axes of the light emergence device and the optical fiber.

U.S. Pat. No. 4,650,285, issued on Mar. 17, 1987 to Stevenson, for HOT ALIGNMENT ASSEMBLY METHOD FOR OPTOELECTRONIC PACKAGES, presents a method for assembling semiconductive optoelectronic devices. A hot alignment step comprises applying power to a semiconductor to aid in the optical alignment.

In U.S. Pat. No. 4,623,220, issued to Grabbe et al on Nov. 18, 1986 for LASER TO FIBER CONNECTION, a device for optically coupling a fiber to a solid state laser is illustrated. A fiber is mounted upon a platform in order to align same with a laser. The attachment material has the same thermal properties of the platform material, thereby minimizing thermal expansion or contraction that would misalign the fiber and laser.

In U.S. Pat. No. 4,441,785, issued on Apr. 10, 1984 to Petrozello, for ROTARY FIBER OPTIC SWITCH, a light emitting diode or laser diode is channeled through a group of fibers to engage a fiber optic switch comprising a rotary drum with light channels disposed therein.

In U.S. Pat. No. 4,405,201, issued to Cefarelli et al on Sep. 20, 1983, for FIBER OPTIC CONNECTOR, a connector that couples multiple pairs of fiber optic transmission lines is shown. The fibers are axially aligned within a plug and mating receptacle disposed in an elastomerically supported holder.

In U.S. Pat. No. 5,781,682, an inexpensive package of roughly aligned chips featuring an array of lasers is illustrated. The loose attachment requires no active alignment.

In U.S. Pat. No. 5,655,041, single path optical waveguides are shown. The device does not contain flex circuits or parallel aligned paths.

In U.S. Pat. No. 5,381,494, a coupler device is shown, which comprises pig-tails. There is no teaching to attach this device with a laser chip.

In U.S. Pat. No. 4,790,617, two fiber ends are aligned and joined together. There is no suggestion or teaching of multiple axes alignment.

In U.S. Pat. No. 5,812,258, eccentric sleeves are used to align two optical components. There is no suggestion of multiple axis alignment.

In U.S. Pat. No. 5,671,311, a plurality of ferrules aligned with a pin alignment fixture is shown. The configuration would not be able to accomplish the alignment and testing provided by the current invention.

SUMMARY OF THE INVENTION

In accordance with the present invention, there is provided a method and apparatus for precisely coupling a plurality of light receiving members to be aligned with a substrate comprising a plurality of light emitting members. It should be understood that this apparatus can be used not only for coupling to a light transmitter, such as an LED, but also for coupling to a light receiver such as an optical detector. However, for simplicity herein, the light alignment tool is referred to as a transmitter. The substrate contains first and second openings. A coupler to be attached thereto has pins that are to be inserted into the first and second openings, in order to roughly align the light receiving members with the light emitting members of the substrate.

During the coupling process, the connection is tested by actuating the light emitting members and, in conjunction therewith, by analyzing the light intensity of the light received by the receiving members. The light receiving members are adjusted about multiple axes to provide a maximum total intensity of light flux. After the adjustment, a UV curable bonding medium is applied to the coupler and substrate. The bonding medium is then subjected to UV light to cure the bonding medium, thereby permanently joining the parts.

It is an object of this invention to provide an improved method and apparatus for aligning a fiber optic transmitter/receiver to a coupler.

It is another object of the invention to provide an alignment method and apparatus for testing the alignment between a plurality of light emitting and light receiving elements during the multiple axes alignment and bonding procedure to provide maximum intensity of the light flux.

BRIEF DESCRIPTION OF THE DRAWINGS

A complete understanding of the present invention may be obtained by reference to the accompanying drawings, when considered in conjunction with the subsequent detailed description, in which.

For purposes of clarity and brevity, like elements and components will bear the same designations and numbering throughout the figures.

DESCRIPTION OF THE PREFERRED EMBODIMENT

Generally speaking, the invention features a method and apparatus for aligning an array of light transmitting elements to an array of photosensitive detectors. The array is adjusted along three axes. Any element (a coupled transmitting and detecting unit of the array) can be selected as the center of rotation. Small angular correction is made about the selected element by differentially moving the array along two axes, using micrometer adjustment tools. Alignment is accomplished by performing translational movement along the horizontal X and Y axes until a signal is detected. Rotational correction about the selected element is performed by moving one of a pair of X adjustment micrometers, until maximum light intensity is achieved for the end elements. Next, the array is scanned for the weakest performing element in the array. The alignment procedure is repeated until the performance of all of the elements in the array fall within a pre-established specification range.

Figure 1:
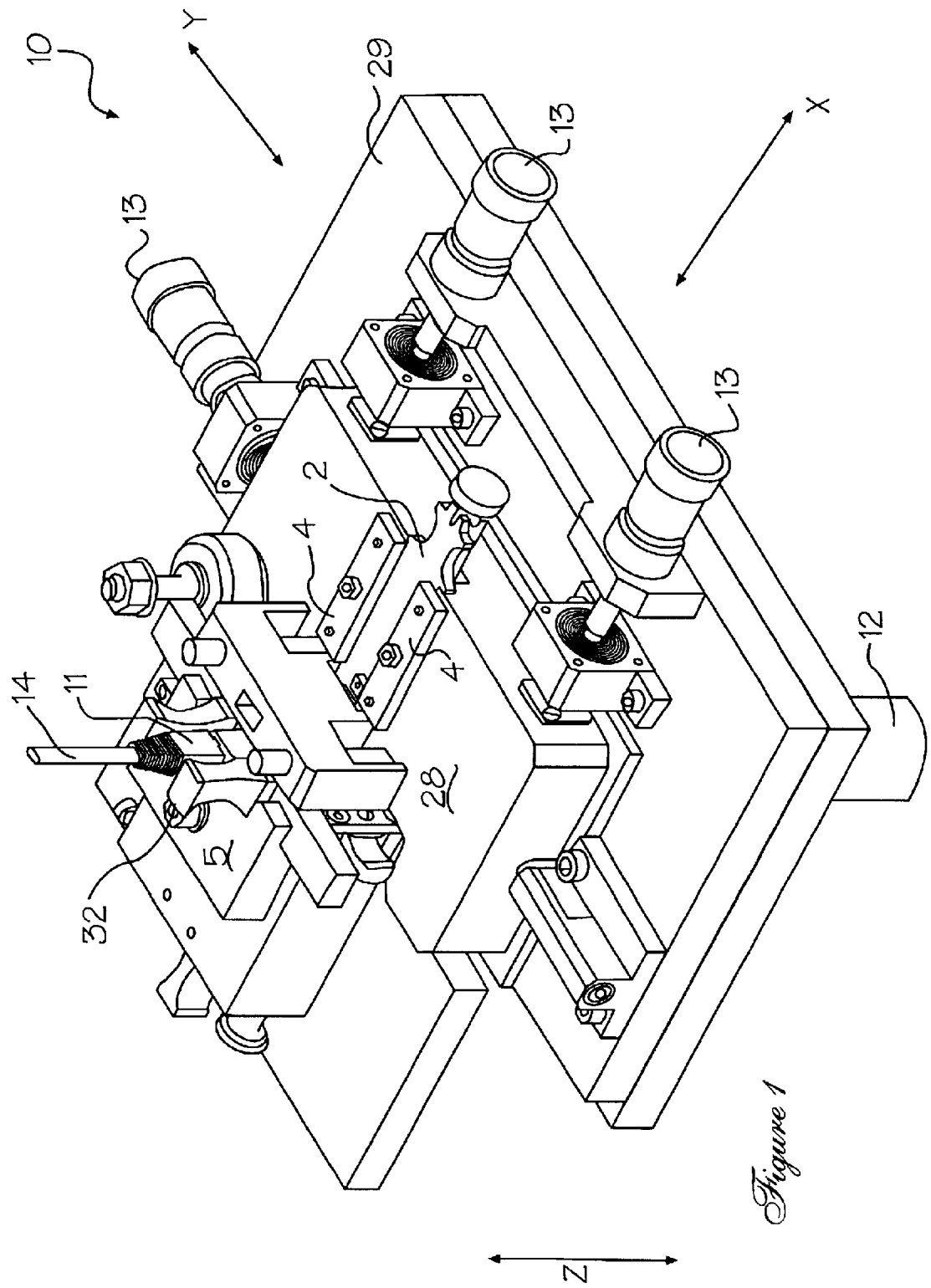
FIG. 1 illustrates a perspective view of the alignment apparatus of this invention.
Figure 2:
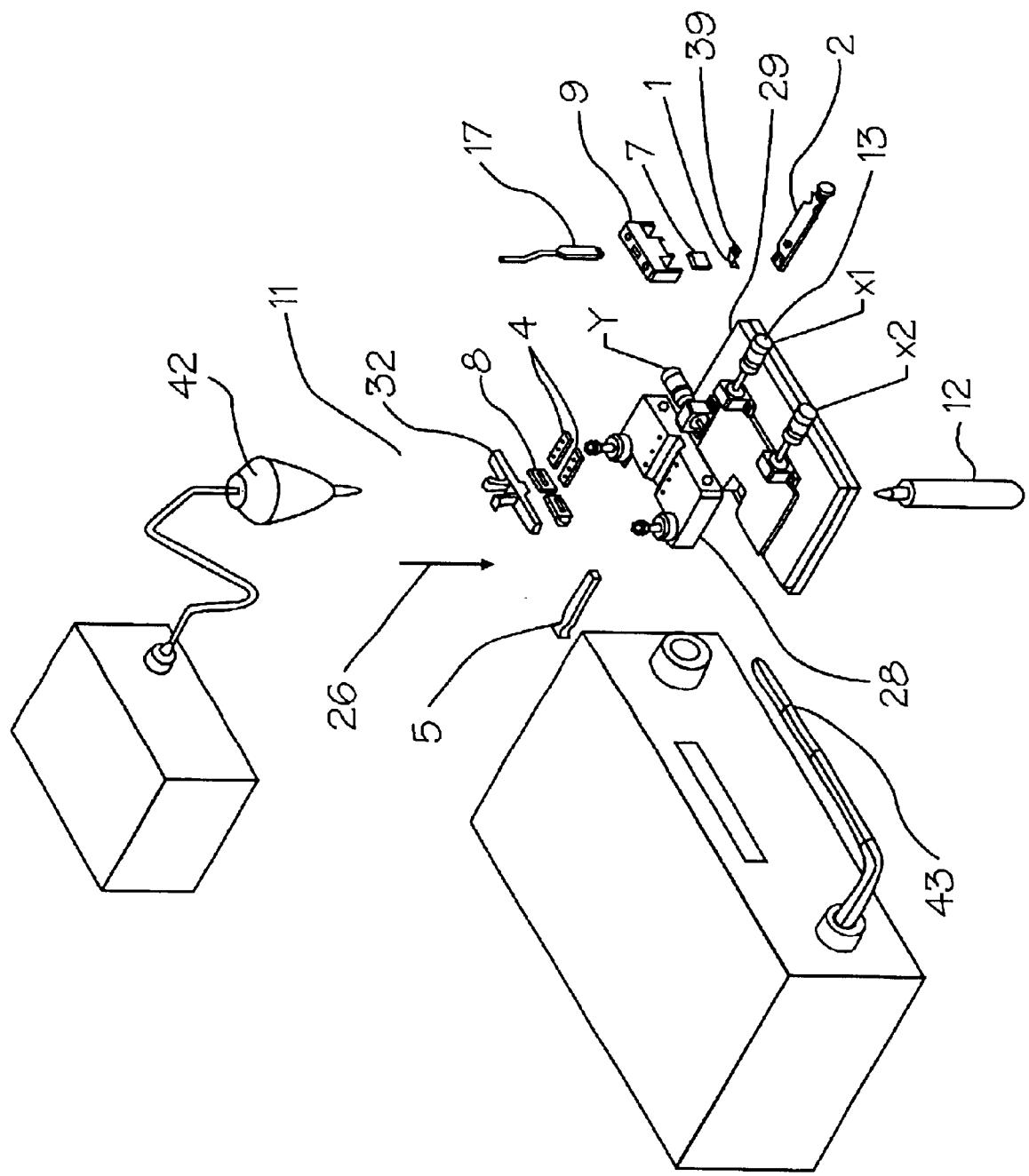
FIG. 2 depicts an exploded, perspective of the alignment apparatus illustrated in FIG. 1.

Now referring to FIGS. 1 and 2, the alignment apparatus 10 of this invention is illustrated. The alignment apparatus 10 consists of an alignment table 29, upon which rests an air bearing alignment stage 28. A heat sink substrate 1, comprising the chip 40, is placed upon a hand-held carrier 2. The heat sink substrate 1 is shown in greater detail in FIG. 4. The hand-held carrier 2 is placed upon the air bearing alignment stage 28. The stage 28 includes clamping bars 4 that hold the substrate 1 in place, after it is deposited on stage 28.

Figures 4, 5:
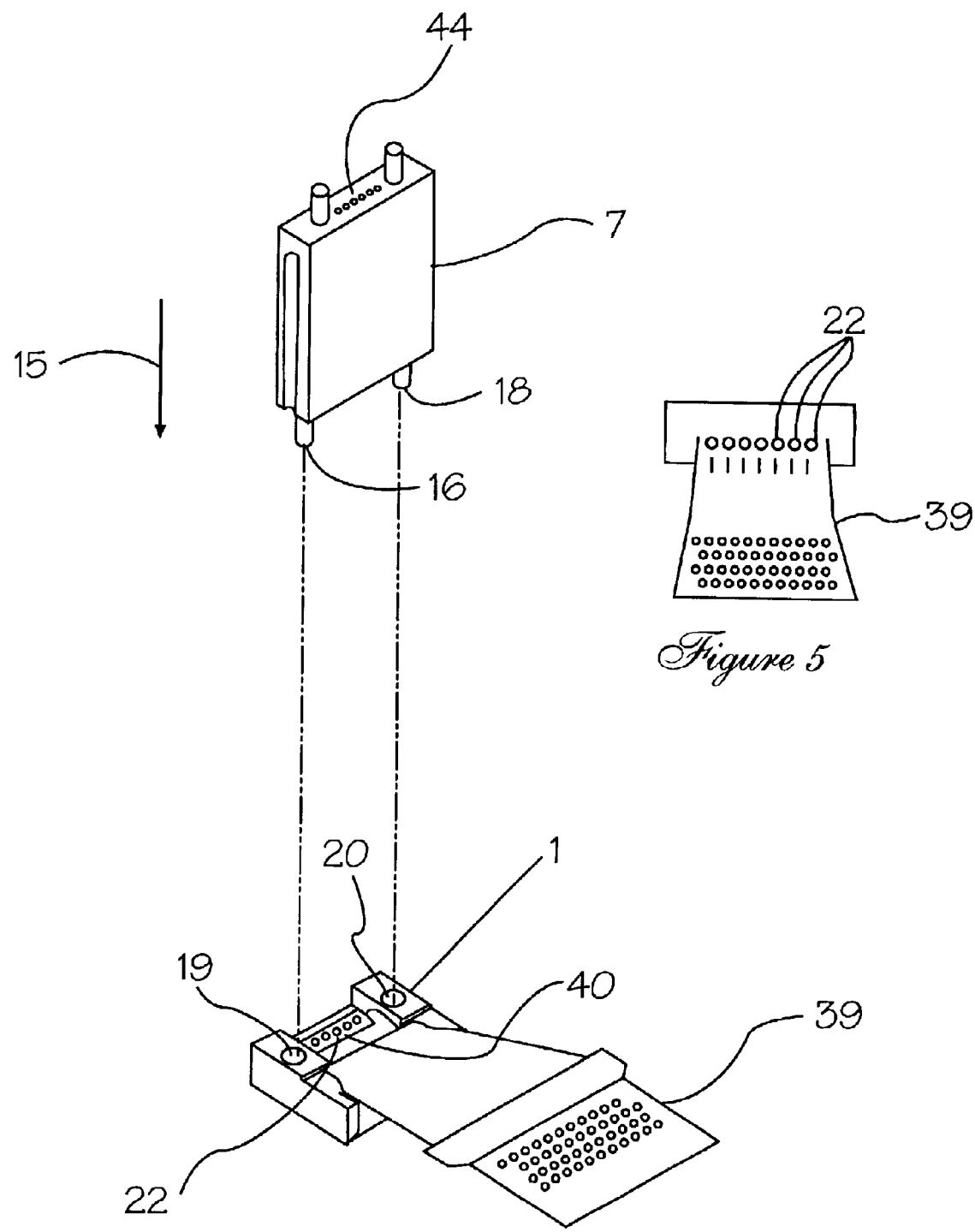
FIG. 4 illustrates a perspective schematic view of the optical coupler, flex circuit, and substrate that is aligned, joined, and tested in the apparatus depicted in FIGS. 1 and 2.
FIG. 5 depicts a top view of the flex circuit and die shown in FIG. 4.

The coupler 7, illustrated in FIG. 4, is to be aligned with the substrate 1, as depicted by arrow 15. The coupler 7 carries two pins 16 and 18 that respectively align with the holes 19 and 20 disposed in the substrate 1. The pins 16 and 18 are undersized for the holes 19 and 20, in order to facilitate the aligning adjustment for the light emitting elements 22 (FIG. 5) to the coupler 7.

Figure 3:
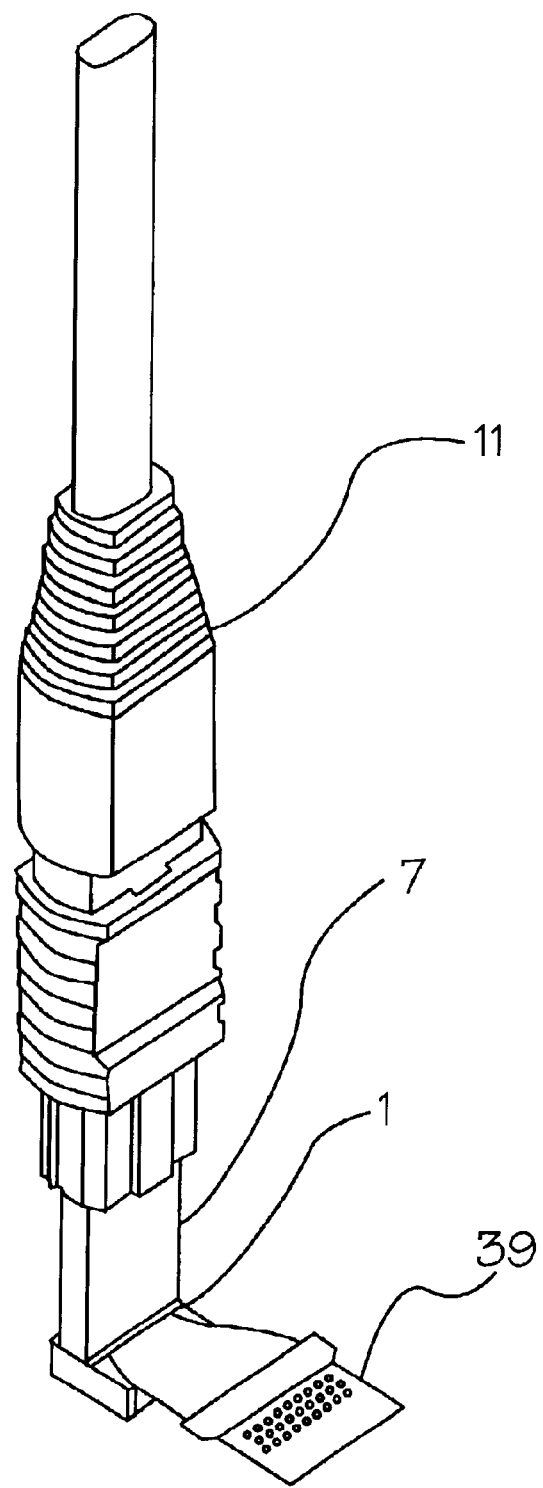
FIG. 3 shows a perspective view of the fiber connector and chip assembly that is aligned in the apparatus depicted in FIGS. 1 and 2.

The attached coupler 7 and substrate 1 are carried on the end of a fiber optic sensor plug 11, as depicted in FIG. 3. A pair of V-shaped groove guide blocks 8 provide lateral alignment and clamping support, as shown in FIG. 2. The coupler 7 is loaded into the retractable, top locator surface stop 5.

Pogo pins or probes 17 disposed upon a supporting bar 9, are lowered, as shown by arrow 26, into matching apertures (not shown) in a flexible circuit strip 39 (FIGS. 2 and 3). A sensor plug 11 is lowered into a locator guide 32 disposed on top of the locator surface stop 5. A vertically movable actuator 12 provides pressure upon the alignment table 29, so that there is positive contact force between the coupler 7 and the substrate 1.

Alignment of the coupler 7 with the transmitting/emitting elements 22 is achieved by adjusting micrometers 13, which move the alignment stage 28 with respect to the alignment table 29, along the X and Y axes. It will be observed that there are two "X" directed micrometers 13, herein referred to as $X_1$ and $X_2$, which allow a rotation as well as a translation adjustment about the X axis. It should be understood, however, that the adjustments need not be performed by manual micrometers, but automated numerical controlled devices including, but not limited to, piezoelectric devices, cams, pneumatic actuators, etc., can similarly be used.

A UV curable adhesive, not shown, can be applied by a dispenser 42 during the alignment procedure. Once the proper alignment is accomplished, the adhesive can be cured by transmitting UV light through the fiber optic cable 43.

Figure 6:
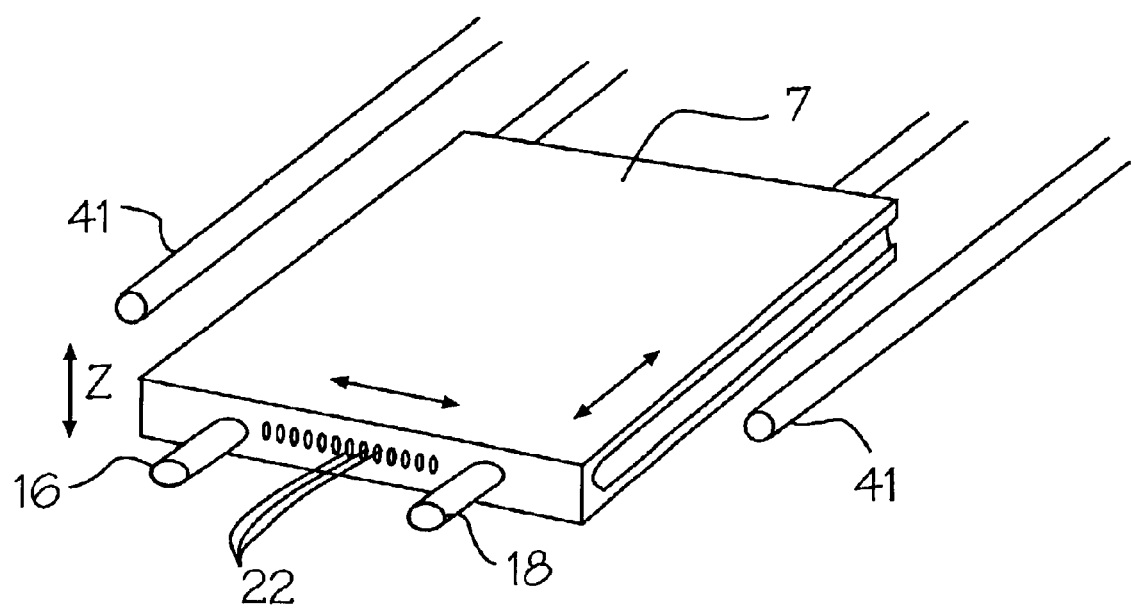
FIG. 6 shows a perspective view of the gripping pins and coupler being adjustably aligned with the chip.

Referring to FIG. 6, the coupler 7 is illustrated in greater detail. Gripper pins 41 that are part of the v-shaped groove guide blocks 8 help align the optical fibers 44 of coupler 7 with the light emitting members 22 of the chip 40.

Operation of the Alignment Apparatus

Generally speaking, the method for the apparatus 10 precisely couples a plurality of light transmitting members that are to be aligned with a substrate comprising a plurality of light emitting members. The substrate 1 contains first and second openings 19 and 20, respectively. The coupler 7 to be attached thereto includes pins 16 and 18 that are respectively inserted into said first and second openings 19 and 20, in order to align the light transmitting optical fibers 44 of coupler 7 with the light emitting members 22 of the chip 40.

During the coupling process, the connection is tested by actuating the light emitting members 22 of the chip 40. In conjunction therewith, the intensity of the light received by the transmitting members 44 is analyzed using flex circuit 39. The light transmitting members 44 are adjusted about multiple axes X and Y to provide a maximum total intensity of light flux. After the adjustment, a UV curable bonding medium is applied to the coupler 7 and chip/substrate assembly. The bonding medium is then subjected to UV light from the fiber optic cable 43, in order to cure the bonding medium, thereby permanently joining the parts.

The actual method steps are as follows:

a) home the $X_1$, $X_2$ and Y micrometers 13.

b) set the laser power source and receiver circuit to an idle state.

c) reset the stage (i.e., move all axes to the load position for $X_1$, $X_2$ and Y).

d) load coupler into the apparatus.

e) load transmitters or receivers onto the stage.

f) connect transmitter or receiver elements to respective circuits.

g) energize the control circuits and cause the coupler to come into contact with respective elements by moving in the vertical Z axis direction.

h) select an element about a mid-portion of the array to be light actuated, and actuate same.

i) lock $X_1$ and $X_2$ together and move them as a single axis until a maximum signal is detected. Move Y axis until maximum detected signal is reached. Repeat these steps until no further improvement is obtained.

j) light a first element.

k) differentially move $X_1$ and $X_2$ to cause a small angular rotation about the center of the selected element, until a maximum signal is detected in the first element.

l) differentially move $X_1$ and $X_2$ to cause a small angular rotation about the center of the selected element, until a maximum signal is detected in the last element.

m) set $X_1$ and $X_2$ such that the X axis displacement is the average of $X_1$ and $X_2$ displacements.

n) light all of the elements.

o) search for the weakest detected signal, and select that element as a new selected element.

p) repeat steps (i) through (o).

q) apply epoxy to the connection and cure with UV light applied through the fiber optic cable.

r) unload the connected device from the apparatus.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention. For example, it would be possible to vary the sequence of steps in the process described above.

Having thus described the invention, what is desired to be protected by Letters Patent is presented in the subsequently appended claims.

What is claimed is:

1. A method for precisely coupling a plurality of light receiving members with a plurality of light emitting members, comprising the steps of:

aligning the light receiving members with the light emitting members;

during the aligning step, testing said alignment by actuating the light emitting members and analyzing the intensity of the light received by said light receiving members;

adjusting said light receiving and said light emitting members about multiple axes to provide a maximum total intensity of light flux;

after the adjusting step, applying a UV curable bonding medium to said light receiving and said light emitting members; and subjecting said UV curable bonding medium to UV light to cure said bonding medium, thereby joining said light receiving and said light emitting members in proper alignment.

2. A method for precisely coupling a plurality of light receiving members with a plurality of light transmitting members, comprising the steps of:

aligning the light receiving members with the light transmitting members;

during the aligning step, testing said alignment by actuating said light transmitting members and analyzing the intensity of the light received by said light receiving members;

adjusting said light receiving and said light transmitting members about multiple axes to provide a maximum total intensity of light flux;

after the adjusting step, applying a UV curable bonding medium to said light receiving and to said light transmitting members; and then subjecting said UV curable bonding medium to UV light to cure said bonding medium, thereby joining said light receiving and said light transmitting members in proper alignment.

3. A method for aligning an array of light transmitting elements to an array of light receiving elements, comprising the steps of:

adjusting the elements of the arrays in three axes;

selecting, as a center of rotation, one of the elements;

making an angular correction about said selected element; and performing translational movement of one of said arrays along one of said three axes until a signal is detected.

4. The method for aligning an array of light transmitting elements to an array of light receiving elements, in accordance with claim 3, wherein said angular correction, further comprises the step of:

differentially moving said selected element in two axes.

5. The method for aligning an array of light transmitting elements to an array of light receiving elements, in accordance with claim 3, wherein said angular correction, further comprises the step of:

rotationally correcting said selected element by moving one of a pair of adjustment micrometers until a maximum light intensity is achieved for end elements of said array.

6. The method for aligning an array of light transmitting elements to an array of light receiving elements, in accordance with claim 5, further comprising the step of:

scanning said array for the weakest performing element thereof.

7. The method for aligning an array of light transmitting elements to an array of light receiving elements, in accordance with claim 6, further comprising the step of:

repeating all of said aforementioned steps until the performance of all of the elements in said array fall within a pre-established specification range.

* * * * *